United States Patent
Donovan et al.

(10) Patent No.: US 8,912,272 B2
(45) Date of Patent: *Dec. 16, 2014

(54) MOISTURE RESISTANT POLYIMIDE COMPOSITIONS

(75) Inventors: Michael Stephen Donovan, Huntley, IL (US); Gurulingamurthy M. Haralur, Evansville, IN (US); Daniel Lowery, Mount Vernon, IN (US)

(73) Assignee: Sabic Innovative Plastics IP B.V., Bergen op Zoom (NL)

( * ) Notice: Subject to any disclaimer, the term of this patent is extended or adjusted under 35 U.S.C. 154(b) by 367 days.

This patent is subject to a terminal disclaimer.

(21) Appl. No.: 12/339,920

(22) Filed: Dec. 19, 2008

(65) Prior Publication Data

US 2010/0159224 A1 Jun. 24, 2010

(51) Int. Cl.
| | |
|---|---|
| *C08L 71/00* | (2006.01) |
| *C08L 79/08* | (2006.01) |
| *C08L 71/10* | (2006.01) |
| *C08G 79/00* | (2006.01) |
| *C08J 5/22* | (2006.01) |
| *C08L 79/04* | (2006.01) |

(52) U.S. Cl.
CPC .............. *C08G 79/00* (2013.01); *C08G 2650/40* (2013.01); *C08J 2379/08* (2013.01); *C08L 79/04* (2013.01); *C08L 71/10* (2013.01); *C08L 71/00* (2013.01); *C08J 5/2256* (2013.01)
USPC .......... 524/538; 428/220; 525/420; 525/434; 525/436

(58) Field of Classification Search
USPC ............ 524/538; 525/420, 434, 436; 428/220
See application file for complete search history.

(56) References Cited

U.S. PATENT DOCUMENTS

| | | |
|---|---|---|
| 6,103,818 A | 8/2000 | Morita et al. |
| 2004/0137247 A1 | 7/2004 | Ono et al. |
| 2007/0066765 A1 | 3/2007 | Aneja et al. |
| 2007/0197739 A1 | 8/2007 | Aneja et al. |

OTHER PUBLICATIONS

PCT International Search Report for International Application No. PCT/US2009/065912.

*Primary Examiner* — Ana Woodward
(74) *Attorney, Agent, or Firm* — Novak Druce Connolly Bove + Quigg LLP

(57) ABSTRACT

The invention relates to a moisture resistant composition comprising: a) from 20 to 80 weight percent based on the total weight of the composition of a polyetherimide copolymer made from a monomer mixture comprising 3,3' bisphenol-A dianhydride (BPADA), and 4,4'-diaminodiphenyl sulfone (DDS); b) from 5 to 75 weight percent based on the total weight of the composition of polyetheretherketone (PEEK); and c) from 0 to 30 weight percent based on the total weight of the composition of a filler. The invention relates to a reflector substrate comprising a moisture resistant layer metalized with a reflective layer, wherein the moisture resistant layer comprising the moisture resistant composition. The invention relates to a method for producing a metalized coating without a primer comprising applying a reflective layer directly to a moisture resistant layer in the absence of a primer, wherein the moisture resistant layer comprises the moisture resistant composition.

5 Claims, No Drawings

MOISTURE RESISTANT POLYIMIDE COMPOSITIONS

BACKGROUND OF THE INVENTION

1. Field of the Invention

The invention relates generally to moisture resistant compositions and in particular to moisture resistant compositions comprising a polyimide copolymer.

2. Background

There is a continuing need for polymers having good manufacturing and performance properties at elevated temperatures. Certain manufacturing properties at elevated temperatures are particularly needed, for example: metalizability, dimensional stability, and resistance to warpage. Likewise, certain performance properties are particularly needed, for example: moisture resistance.

Lighting reflectors, especially for automotive applications, require materials that can withstand the high heat produced by light sources, that have excellent dimensional stability to focus the light in a tight pattern at long distances, and that can be easily processed into complex shapes. These reflectors are usually coated with a metal, such as aluminum, to provide a highly reflective surface. To achieve this high degree of reflectivity with low haze, a very smooth pre-coated surface is required. In order to achieve consistently such a smooth pre-coated surface, it has typically been necessary to base coat the molded reflector with a primer prior to coating the reflector with metal. Direct metalization of molded parts is also challenging because it introduces the additional requirements of good adhesion of the metal to the molded part and a very smooth surface of the part as molded.

In electronic components there has been a move to leadless solder at least partially because of the deleterious effects caused by lead on the environment. Replacement solders have higher melting points than lead based solders and so polymers capable of withstanding the additional heat necessary to melt the lead replacement solders are needed for use as, for example, substrates or coatings in close proximity to soldering points. Even uses such as polymer parts feeling the heat from jet engine wash, lead a continuing demand for polymers having higher heat properties than those currently on the market.

Several classes of high heat polymers are known in the art. Polyetherimide resins are known for high heat distortion temperatures and high glass transition temperatures that make their use as coatings, molded articles, composites, and the like very attractive where high temperature resistance is desired. Due to their high glass transition temperature and high melt viscosity, however, polyetherimides can be difficult to process into finished products. Additionally, improvements are needed in the moisture resistance and metalizability of compositions comprising polyetherimide resins for leadless solderable articles.

For the foregoing reasons, there is a need for metalizable, moisture resistant compositions useful for lead free solderable articles. There is also a need for a method of producing a metalized coating without a primer.

BRIEF SUMMARY OF THE INVENTION

It has been surprisingly discovered that by using a specific combination of a polyimide and a polyetheretherketone, it is possible to make a composition that is metalizable and moisture resistant. Preferably, the compositions according to the present invention can be made into articles/parts containing a metalized coating without a primer. The compositions according to the present invention preferably can be used in articles that include light emitting diodes as well as other articles.

A first embodiment of the present invention relates to a moisture resistant composition comprising: a) from 20 to 80 weight percent based on the total weight of the composition of a polyetherimide copolymer made from a monomer mixture comprising 3,3' bisphenol-A dianhydride (BPADA), and 4,4'-diaminodiphenyl sulfone (DDS); b) from 5 to 75 weight percent based on the total weight of the composition of polyetheretherketone (PEEK); and c) from 0 to 30 weight percent based on the total weight of the composition of a filler.

A second embodiment of the invention relates to a reflector substrate comprising a moisture resistant layer metalized with a reflective layer, wherein the moisture resistant layer comprises: a) from 20 to 80 weight percent based on the total weight of the composition of a polyetherimide copolymer made from a monomer mixture comprising 3,3' bisphenol-A dianhydride (BPADA), and 4,4'-diaminodiphenyl sulfone (DDS); b) from 5 to 75 weight percent based on the total weight of the composition of polyetheretherketone (PEEK); and c) from 0 to 30 weight percent based on the total weight of the composition of a filler. Preferably, the reflective layer is selected from the group consisting of silver, aluminum, and combinations thereof.

A third embodiment of the invention relates to a method for producing a metalized coating without a primer comprising applying a reflective layer directly to a moisture resistant layer in the absence of a primer, wherein the moisture resistant layer comprises: a) from 20 to 80 weight percent based on the total weight of the composition of a polyetherimide copolymer made from a monomer mixture comprising 3,3' bisphenol-A dianhydride (BPADA), and 4,4'-diaminodiphenyl sulfone (DDS); b) from 5 to 75 weight percent based on the total weight of the composition of polyetheretherketone (PEEK); and c) from 0 to 30 weight percent based on the total weight of the composition of a filler. Preferably, the method further comprises drying the moisture resistant layer prior to applying the reflective layer. Preferably, the reflective layer is applied by electroplating or vapor-deposition.

These and other features, aspects, and advantages of the present invention will become better understood with reference to the following description and appended claims.

DETAILED DESCRIPTION OF THE INVENTION

The present invention may be understood more readily by reference to the following detailed description of preferred embodiments of the invention as well as to the examples included therein. In the following detailed description and in the claims, which follow, reference will be made to a number of terms, which shall be defined to have the following meanings:

The term "reflector" refers to a light modifying device having a surface, which redirects incident light back into the medium from which it came. Reflectors are more commonly opaque but may be transparent. Light incident on the redirecting surface of a transparent reflector may arrive from the transparent material of the reflector itself in which case it is redirected back into the transparent material of the reflector, or it may arrive at the redirecting surface from some other material (e.g., air) in which case it is redirected back into the other material.

For purposes of the present invention a "metalized" surface is a surface that is covered with a coating comprising one or more metals.

For purposes of the present invention, an L.E.D. is a light emitting diode, as that term is known to one of ordinary skill in the art.

"High Tg" refers to polymers having glass transition temperature(s) of 180° C. or above.

"Popcorning" refers to an effect occurring when residual moisture, collected after conditioning, converts to steam within a component, part, surface, composition, material, or composition, to disrupt a dimension thereof.

"Warpage" refers to a dimensional distortion in an object, particularly in a molded object.

"Primer" refers to a first coating applied to a surface to reduce absorbency and/or to improve adhesion of subsequent coatings.

For purposes of the present invention the term "coating" means a film or thin layer applied to a base material, called the substrate. In the present invention the substrate is made up of one or more polymers, co-polymers, and/or compositions of polymers. The coating can comprise any material which the skilled artisan would employ as a coating on a polymeric substrate, including, but not limited to, one or more metals, one or more adhesives, one or more paints, one or more alloys, one or more solid-liquid suspensions, one or more polymers with at least one of the polymers in the coating having a different composition than the polymeric substrate.

For purposes of the present invention, there can be as many layers of coatings on the substrate as necessary to accomplish the intended purpose of the article of manufacture. The term "thin" as used above, means that the thickness of the coating on the article, at the coatings thickest point, is less than the greatest length of a straight line passing through the center of gravity of the article and which extends to, but not beyond the outer most boundaries of the article.

The coating may be applied by any coating means known to the skilled artisan. For example, the coating may be applied by electrolysis, vapor deposition, vacuum evaporation, sputtering, or mechanical means such as brushing spraying, calendaring, overmolding, lamination, and roller coating.

All numeric values are herein assumed to be modified by the term "about," whether or not explicitly indicated. The term "about" generally refers to a range of numbers that one of skill in the art would consider equivalent to the recited value (i.e., having the same, function or result). In many instances, the term "about" may include numbers that are rounded to the nearest significant figure. Unless otherwise indicated all parts or percentages are parts by weight or percentages by weight. Unless otherwise indicated all molecular weights are weight average molecular weights.

Various moisture resistant compositions according present invention satisfy the need for an improvement in the moisture resistance and metalizability of polyetherimide (PEI) systems for lead free solderable articles. Particularly preferred embodiments of the present invention relate to a two-phase blend of a polyimide resin, having a high glass transition temperature (Tg) and a semi-crystalline or liquid crystal polymer (LCP) resin. The two-phase blend is particularly useful for light emitting diode (LED) reflector substrates. The moisture resistant compositions according to the present invention are also preferably used in many different electronic components. The moisture resistant compositions according to the present invention are preferably molded into articles and used in the construction of semiconductor packages and other electronic devices that are exposed to lead-free soldering temperatures.

The moisture resistant compositions according to the present are preferably have a smooth surface and survive lead free soldering temperatures after exposure to highly humid environments. The moisture resistant compositions according to the present invention preferably demonstrate good metalizability; can preferably withstand exposure to highly humid environments; and preferably exhibit good dimensional stability by retaining molded or otherwise formed dimensions upon exposure to lead free solder reflow temperatures. Particularly preferred moisture resistant compositions according to the present invention can be metalized with a smooth, highly reflective surface and survive exposure to temperatures greater than or equal to 240° C., more preferably greater than or equal to 250° C., more preferably greater than or equal to 260° C., more preferably greater than or equal to 270° C., and more preferably greater than or equal to 280° C.

A first embodiment of the present invention relates to a moisture resistant composition comprising: a) from 20 to 80 weight percent based on the total weight of the composition of a polyetherimide copolymer made from a monomer mixture comprising 3,3' bisphenol-A dianhydride (BPADA), and 4,4'-diaminodiphenyl sulfone (DDS); b) from 5 to 75 weight percent based on the total weight of the composition of polyetheretherketone (PEEK); and c) from 0 to 30 weight percent based on the total weight of the composition of a filler. Preferably, the monomer mixture further comprises 3-chlorophthalic anhydride.

Preferably, the moisture resistant composition comprises about 80 weight percent based on the total weight of the composition of component a), about 20 weight percent based on the total weight of the composition of component b), and about 0 weight percent based on the total weight of the composition of component c). Preferably, the moisture resistant composition comprises about 70 weight percent based on the total weight of the composition of component a), about 30 weight percent based on the total weight of the composition of component b), and about 0 weight percent based on the total weight of the composition of component c). Preferably, the moisture resistant composition comprises about 75 weight percent based on the total weight of the composition of component a), about 15 weight percent based on the total weight of the composition of component b), and about 10 weight percent based on the total weight of the composition of component c). Preferably, the moisture resistant composition comprises about 65 weight percent based on the total weight of the composition of component a), about 15 weight percent based on the total weight of the composition of component b), and about 20 weight percent based on the total weight of the composition of component c). Preferably, the moisture resistant composition comprises about 25 weight percent based on the total weight of the composition of component a), about 66 weight percent based on the total weight of the composition of component b), and about 9 weight percent based on the total weight of the composition of component c).

Preferably, a molded part comprising the moisture resistant composition and having a thickness of from 1 to 3 mm does not exhibit popcorning in a dry atmosphere at 260° C. More preferably, a molded part comprising the moisture resistant composition and having a thickness of from 1 to 3 mm does not exhibit popcorning at 60° C./60% relative humidity at 260° C. Still more preferably, a molded part comprising the moisture resistant composition and having a thickness of from 1 to 3 mm does not exhibit popcorning at 80° C./85% relative humidity at 260° C.

Preferably, a molded part comprising the moisture resistant composition and having a thickness of from 1 to 3 mm exhibits a warpage of less than or equal to 0.5 mm in a dry atmosphere at 260° C. More preferably, a molded part comprising the moisture resistant composition and having a thickness of from 1 to 3 mm exhibits a warpage of less than or equal to 0.5 mm at 30° C./60% relative humidity at 260° C. Still more preferably, a molded part comprising the moisture resistant composition and having a thickness of from 1 to 3 mm exhibits a warpage of less than or equal to 0.5 mm at 60° C./60% relative humidity at 260° C. Particularly preferably, a molded part comprising the moisture resistant composition and having a thickness of from 1 to 3 mm exhibits a warpage of less than or equal to 0.5 mm at 80° C./85% relative humidity at 260° C.

A second embodiment of the invention relates to a reflector substrate comprising a moisture resistant layer metalized with a reflective layer, wherein the moisture resistant layer comprises: a) from 20 to 80 weight percent based on the total weight of the composition of a polyetherimide copolymer made from a monomer mixture comprising 3,3' bisphenol-A dianhydride (BPADA), and 4,4'-diaminodiphenyl sulfone (DDS); b) from 5 to 75 weight percent based on the total weight of the composition of polyetheretherketone (PEEK); and c) from 0 to 30 weight percent based on the total weight of, the composition of a filler. Preferably, the reflective layer is selected from the group consisting of silver, aluminum, and combinations thereof.

A third embodiment of the invention relates to a method for producing a metalized coating without a primer comprising applying a reflective layer directly to a moisture resistant layer in the absence of a primer, wherein the moisture resistant layer comprises: a) from 20 to 80 weight percent based on the total weight of the composition of a polyetherimide copolymer made from a monomer mixture comprising 3,3' bisphenol-A dianhydride (BPADA), and 4,4'-diaminodiphenyl sulfone (DDS); b) from 5 to 75 weight percent based on the total weight of the composition of polyetheretherketone (PEEK); and c) from 0 to 30 weight percent based on the total weight of the composition of a filler. Preferably, the method further comprises drying the moisture resistant layer prior to applying the reflective layer. Preferably, the reflective layer is applied by electroplating.

In addition to the polymer components of the composition, other beneficial compositions may be added to produce an improved article of manufacture. The skilled artisan will appreciate the wide range of ingredients, such as heat stabilizers, fillers, or colorants, which can be added to polymers to improve one or more manufacturing or performance property.

In some cases a metal oxide may be added to the polymers of the present invention. In some instances the metal oxide may further improve flame resistance (FR) performance by decreasing heat release and increasing the time to peak heat release. Titanium dioxide is of note. Other metal oxides include zinc oxides, boron oxides, antimony oxides, iron oxides, and transition metal oxides. Metal oxides that are white may be desired in some instances. Metal oxides may be used alone or in combination with other metal oxides. Metal oxides may be used in any effective amount, in some instances at from 0.01 to 20-wt % of the polymer composition.

Other useful additives include smoke suppressants such as metal borate salts for example zinc borate, alkali metal or alkaline earth metal borate or other borate salts. Additionally other of boron containing compounds, such as boric acid, borate esters, boron oxides or other oxygen compounds of boron may be useful. Additionally other flame retardant additives, such as aryl phosphates and brominated aromatic compounds, including polymers containing linkages made from brominated aryl compounds, may be employed. Examples of halogenated aromatic compounds are brominated phenoxy resins, halogenated polystyrenes, halogenated imides, brominated polycarbonates, brominated epoxy resins, and mixtures thereof.

Conventional flame retardant additives, for example, phosphate esters, sulfonate salts, and halogenated aromatic compounds may also be employed. Mixtures of any or all of these flame-retardants may also be used. Examples of halogenated aromatic compounds are brominated phenoxy resins, halogenated polystyrenes, halogenated imides, brominated polycarbonates, brominated epoxy resins, and mixtures thereof. Examples of sulfonate salts are potassium perfluoro butyl sulfonate, sodium tosylate, sodium benzene sulfonate, sodium dichloro benzene sulfonate, potassium diphenyl sulfone sulfonate and sodium methane sulfonate. In some instances sulfonate salts of alkaline and alkaline earth metals are preferred. Examples of phosphate flame retardants are tri aryl phosphates, tri cresyl phosphate, triphenyl phosphate, bisphenol A phenyl diphosphates, resorcinol phenyl diphosphates, phenyl-bis-(3,5,5'-trimethylhexyl phosphate), ethyl diphenyl phosphate, bis(2-ethylhexyl)-p-tolyl phosphate, bis (2-ethylhexyl)-phenyl phosphate, tri(nonylphenyl)phosphate, phenyl methyl hydrogen phosphate, di(dodecyl)-p-tolyl phosphate, halogenated triphenyl phosphates, dibutyl phenyl phosphate, 2-chloroethyldiphenyl phosphate, p-tolyl bis(2,5,5'-trimethylhexyl) phosphate, 2-ethylhexyldiphenyl phosphate, diphenyl hydrogen phosphate, resorcinol diphosphate and the like.

In some instances it maybe desired to have flame retardant compositions that are essentially free of halogen atoms, especially bromine and chlorine. Essentially free of halogen atoms means that in some embodiments the composition has less than about 3% halogen by weight of the composition and in other embodiments less than about 1% by weight of the composition containing halogen atoms. The amount of halogen atoms can be determined by ordinary chemical analysis.

The composition may also optionally include a fluoropolymer in an amount of 0.01 to about 5.0% fluoropolymer by weight of the composition. The fluoropolymer may be used in any effective amount to provide anti-drip properties to the resin composition. Some possible examples of suitable fluoropolymers and methods for making such fluoropolymers are set forth, for example, in U.S. Pat. Nos. 3,671,487, 3,723,373 and 3,383,092. Suitable fluoropolymers include homopolymers and copolymers that comprise structural units derived from one or more fluorinated alpha-olefin monomers. The term "fluorinated alpha-olefin monomer" means an alpha-olefin monomer that includes at least one fluorine atom substituent. Some of the suitable fluorinated alpha-olefin monomers include, for example, fluoro ethylenes such as, for example, $CF_2=CF_2$, $CHF=CF_2$, $CH_2=CF_2$ and $CH_2=CHF$ and fluoro propylenes such as, for example, $CF_3CF=CF_2$, $CF_3CF=CHF$, $CF_3CH=CF_2$, $CF_3CH=CH_2$, $CF_3CF=CHF$, $CHF_2CH=CHF$ and $CF_3CF=CH_2$.

Some of the suitable fluorinated alpha-olefin copolymers include copolymers comprising structural units derived from two or more fluorinated alpha-olefin monomers such as, for example, poly(tetrafluoro ethylene-hexafluoro ethylene), and copolymers comprising structural units derived from one or more fluorinated monomers and one or more non-fluorinated monoethylenically unsaturated monomers that are copolymerizable with the fluorinated monomers such as, for example, poly(tetrafluoroethylene-ethylene-propylene) copolymers. Suitable non-fluorinated monoethylenically unsaturated monomers include for example, alpha-olefin monomers such as, for example, ethylene, propylene, butene, acrylate monomers such as for example, methyl methacrylate, butyl acrylate, and the like, with poly(tetrafluoroethylene) homopolymer (PTFE) preferred.

The compositions may further contain fillers (at least some of which act as reinforcements) for example fiberglass, milled glass, glass beads, flake, and the like. Minerals such as talc, wollastonite, mica, kaolin or montmorillonite clay, silica, quartz and barite may be added. The compositions can also be modified with effective amounts of inorganic fillers, such as, for example, carbon fibers and nanotubes, metal fibers, metal powders, conductive carbon, and other additives including nano-scale reinforcements.

Other additives include antioxidants such as phosphites, phosphonites, and hindered phenols. Phosphorus containing stabilizers including triaryl phosphite and aryl phosphonates are of note as useful additives. Difunctional phosphorus containing compounds can also be employed. Stabilizers with a molecular weight of greater than or equal to about 300 are preferred. In other instances phosphorus containing stabilizers with a molecular weight of greater than or equal to 500 are useful. Phosphorus containing stabilizers are typically present in the composition at 0.05-0.5% by weight of the formulation. Colorants as well as light stabilizers and UV absorbers may also be present in the composition. Flow aids and mold release compounds are also contemplated. Examples of mold release agents are alkyl carboxylic acid esters, for example, pentaerythritol tetrastearate, glycerin tristearate, and ethylene glycol distearate. Mold release agents are typically present in the composition at 0.05-0.5% by weight of the formulation. Preferred mold release agents will have high molecular weight, typically greater than about 300, to prevent loss of the release agent from the molten polymer mixture during melt processing.

Polymer compositions used in articles according to the present invention may also include various additives such as nucleating, clarifying, stiffness and/or crystallization rate agents. These agents are used in a conventional matter and in conventional amounts.

Advantageously, it is now possible to make compositions containing a specific combination of a polyimide and a polyetheretherketone and make a composition that is metalizable moisture resistant. It is now possible to make compositions into articles/parts containing a metalized coating without a primer.

The following examples further illustrate the present invention, in which all parts are by weight unless otherwise indicated.

Examples 1-58

Materials

The following neat resins were used in Examples 1-58:

| Acronym | Commercial Name | Chemical Name |
| --- | --- | --- |
| UH1016 | EXTEM (TM) UH TPI | 4,4'-oxydiphthalic dianhydride (ODPA), and 4,4'-diaminodiphenyl sulfone (DDS) |
| XH1015 | EXTEM (TM) XH TPI | 3,3' bisphenol-A dianhydride (BPADA), and 4,4'-diaminodiphenyl sulfone (DDS) |
| XH6050 | ULTEM (TM) PEI | 4,4' bisphenol-A dianhydride (BPADA), and 4,4'-diaminodiphenyl sulfone (DDS) |
| 1000 | ULTEM (TM) PEI | 4,4' bisphenol-A dianhydride (BPADA), and meta-phenylenediamine |
| PEEK | VICTREX (TM) PEEK 150 | Polyether ether ketone |
|  | Silica | Fused Silica |

Techniques/Procedures

The following procedures were used in the indicated examples.

Blend Preparation Procedures

Whenever blends were used in these examples, the required resin components were dry blended and tumbled. The raw blend was dried at 235° F. (113° C.) for 8 hrs, prior to extrusion. The blend was extruded on a 30 mm twin screw, vacuum vent extruder. The extruder was set at 316° C. to 360° C. through 6 zones. The screws ran at 300 rpm and a vacuum was pulled down to 27 in Hg. Pellets were collected after the polymer was cooled through a water bath.

Experimental Procedure

The selected or blend was selected due to the inherent high temperature and low moisture absorption: Parts were then molded to the dimensions of:

15 mm×150 mm×1 mm
15 mm×150 mm×2 mm
15 mm×150 mm×3 mm

These parts were first dried in a vacuum oven at 220° C. for 4 hrs. The parts to be conditioned were then placed in a humidity/temperature controlled chamber as per the following conditions:

60° C./60% RH/120 hr, or
80° C./85% RH/165 hr

These samples, along with a non-conditioned, dry, sample, were placed in a Reflow Machine—Yamato-Seisakusyo NRY-525SMB-5Z, 5-zone convection chamber. The conveyer speed was set at 300 mm/min and nitrogen was purged through. The heating profile the Reflow Machine was set through 5 zones, at specific temperatures for each part thickness. The parts were passed through 2 heating conditions, with different peak temperatures.

TABLE 1

Temperature Profile for 260 C. Peak Temp

|  | Zone 1 | Zone 2 | Zone 3 | Zone 4 | Zone 5 |
| --- | --- | --- | --- | --- | --- |
| Part Thickness 1 mm | 170 | 160 | 160 | 182 | 279 |
| Part Thickness 2 mm | 170 | 160 | 160 | 187 | 300 |
| Part Thickness 3 mm | 170 | 160 | 160 | 185 | 310 |

TABLE 2

Temperature Profile for 270 C. Peak Temp

|  | Zone 1 | Zone 2 | Zone 3 | Zone 4 | Zone 5 |
| --- | --- | --- | --- | --- | --- |
| Part Thickness 1 mm | 170 | 160 | 160 | 182 | 300 |
| Part Thickness 2 mm | 170 | 160 | 160 | 185 | 310 |
| Part Thickness 3 mm | 170 | 160 | 160 | 199 | 318 |

Examples 1-8

260° C., $1^{st}$ Pass, Popcorning Evaluation

The purpose of these examples was to evaluate certain compositions in accordance to the present invention for certain performance properties, namely dimensional stability, popcorning effect (if any).

Compositions illustrating specific embodiments of the present invention were prepared in accordance to the Blend Preparation Procedure described above. Neat resins were also used. The compositions tested are summarized in Table 3.

TABLE 3

| Ex. | Composition Tested | Blend Ratio | Description/Remarks |
|---|---|---|---|
| 1 | XH1015 | Neat | Comparative (Neat Resin) |
| 2 | UH1006 | Neat | Comparative (Neat Resin) |
| 3 | XH1015/PEEK | 60/40 | Invention |
| 4 | XH1015/XH6050 | 50/50 | (Comparative) |
| 5 | UH1016/PEEK/Silica | 33/50/17 | (Comparative) |
| 6 | UH1016/XH1015 | 75/25 | (Comparative) |
| 7 | UH1016/XH1015/PEEK | 20/50/30 | (Comparative) |
| 8 | UH1016/XH1015/PEEK/Silica | 17/41/25/17 | (Comparative) |

The above-mentioned compositions/materials were tested in accordance to the Experimental Procedure described above, with the heating profile described in Table 1, with a single pass through the reflow machine. A "popcorning" effect was noted as a visual defect. This occurred when residual moisture, collected after conditioning, converted to steam within the part, thereby disrupting the part dimension. The samples were evaluated. A "Pass" was given to samples that did not exhibit popcorning while "Fail" was given to samples that did exhibit a popcorning effect. The results are summarized in Table 4 below:

TABLE 4

Popcorning Results for LED Composition DoE.
Peak Temp 260 C., First Pass

| Ex | Composition | Dry (Unconditioned) | | | 60° C./60% RH | | | 80° C./85% RH | | |
|---|---|---|---|---|---|---|---|---|---|---|
| | | 1 mm | 2 mm | 3 mm | 1 mm | 2 mm | 3 mm | 1 mm | 2 mm | 3 mm |
| 1 | XH1015 (Comparative) | Pass | Pass | Pass | Pass | Fail | n/a | Fail | Fail | n/a |
| 2 | UH1006 (Comparative) | Pass | Pass | Pass | Pass | Fail | Fail | Fail | Fail | Fail |
| 3 | XH1015/PEEK (Invention) | Pass | Pass | Pass | Pass | Pass | Pass | Pass | Pass | Pass |
| 4 | XH1015/XH6050 (Comparative) | Pass | Pass | Pass | Fail | Fail | n/a | Fail | Fail | Fail |
| 5 | UH1016/PEEK/Silica (Comparative) | Pass | Pass | Pass | Pass | Pass | Fail | Pass | Pass | Fail |
| 6 | UH1016/XH1015 (Comparative) | Pass | Pass | Pass | Fail | Fail | Fail | Fail | Fail | Fail |
| 7 | UH1016/XH1015/PEEK (Comparative) | Pass | Pass | Pass | Pass | Fail | Fail | Fail | Fail | Fail |
| 8 | UH1016/XH1015/PEEK/Silica | Pass | Pass | Pass | Pass | Pass | Pass | Pass | Fail | Fail |

Discussion

These results show that when the parts were dry (unconditioned), not subject to the heat and moisture conditions, parts having a thickness of 1 mm, 2 mm, and 3 mm all passed. However, when the parts were exposed to conditions that included 60° C./60% RH (Relatively Humidity), the only composition that passed at 1 mm, 2 mm, and 3 mm was the composition of Example 3. All the other materials/compositions failed.

When the parts were exposed to conditions that included 80° C./85% RH, the only composition that passed at 1 mm, 2 mm, and 3 mm was the compositions of Example 3. All the other materials/compositions failed.

Examples 9-16

260° C., 1$^{st}$ Pass, Warpage Evaluation

The purpose of these examples was to evaluate certain compositions in accordance to the present invention for certain performance properties, namely dimensional stability, through a warpage criteria.

Preparation Techniques

Compositions illustrating specific embodiments of the present invention were prepared in accordance to the Blend Preparation Procedure described above. Neat resins were also used. The compositions tested are summarized in Table 5.

TABLE 5

| Ex. | Composition Tested | Blend Ratio | Description/Remarks |
|---|---|---|---|
| 9 | XH1015 | Neat | Comparative (Neat Resin) |
| 10 | UH1006 | Neat | Comparative (Neat Resin) |
| 11 | XH1015/PEEK | 60/40 | Invention |
| 12 | XH1015/XH6050 | 50/50 | (Comparative) |
| 13 | UH1016/PEEK/Silica | 33/50/17 | (Comparative) |
| 14 | UH1016/XH1015 | 75/25 | (Comparative) |
| 15 | UH1016/XH1015/PEEK | 20/50/30 | (Comparative) |
| 16 | UH1016/XH1015/PEEK/Silica | 17/41/25/17 | (Comparative) |

Testing Techniques

The above-mentioned compositions/materials were tested in accordance to the Experimental Procedure described above, with the heating profile described in Table 1, with a single pass through the reflow machine.

The part warpage was measured with a micrometer. An acceptable warpage measurement is defined as less than 0.3 mm increase at the apex of the part. Samples that "popcorned" in earlier examples were not measured.

Results:

TABLE 6

| | | 260° C. First Pass | | | | | | | | |
|---|---|---|---|---|---|---|---|---|---|---|
| | | Dry | | | 60° C./60% RH | | | 80° C./85% RH | | |
| Ex | Composite | 1 mm | 2 mm | 3 mm | 1 mm | 2 mm | 3 mm | 1 mm | 2 mm | 3 mm |
| 9 | XH1015 (Comparative) | 0.00 | 0.00 | 0.00 | 0.01 | | | | | |
| 10 | UH1006 (Comparative) | 0.00 | 0.00 | 0.01 | 0.01 | | | | | |
| 11 | XH1015/ PEEK (Invention) | 0.00 | 0.01 | 0.03 | 0.00 | 0.01 | 0.03 | 0.00 | 0.01 | 0.02 |
| 12 | XH1015/ XH6050 (Comparative) | 0.00 | 0.04 | 0.05 | | | | | | |
| 13 | UH1016/ PEEK/Silica (Comparative) | 0.01 | 0.00 | 0.05 | 0.01 | 0.00 | n/a | 0.00 | 0.01 | n/a |
| 14 | UH1016/ XH1015 (Comparative) | 0.00 | 0.00 | 0.00 | | | | | | |
| 15 | UH1016/ XH1015/ PEEK (Comparative) | 0.00 | 0.01 | 0.02 | 0.00 | | | | | |
| 16 | UH1016/ XH1015/ PEEK/Silica (Comparative) | 0.02 | 0.01 | 0.00 | 0.01 | 0.02 | 0.02 | 0.02 | | |

Discussion

As evidenced by Table 6, all of the articles exhibited sufficient warpage resistance and passed the warpage criteria. None of the Comparative Examples performed as well as the compositions of Example 11. These results show that any part that did not popcorn has passed the warpage test for this heating profile. Dry (unconditioned), parts having a thickness of 1 mm, 2 mm, and 3 mm all passed. Parts conditioned at 60° C./60% RH and 85° C./85% RH also passed.

Examples 17-21

260° C., 1$^{st}$ Pass, XH1015-PEEK, Popcorning Evaluation

Of the compositions evaluated, the XH1015-PEEK sample performed best in the reflow test. The composition passed the all conditions during the reflow and displayed the greatest dimensional stability.

The P2-PEEK composition was the focus of a second DoE, Table 7, and Silica was added as a potential cost reduction for the blend.

TABLE 7

| Example | Composition Tested | Blend Ratio | Description/Remarks |
|---|---|---|---|
| 17 | XH1015/PEEK/Silica | 75/15/10 | Comparative |
| 18 | XH1015/PEEK/Silica | 65/15/20 | Comparative |
| 19 | XH1015/PEEK/Silica | 55/15/30 | Comparative |
| 20 | XH1015/PEEK/Silica | 65/5/30 | Comparative |
| 21 | XH1015/PEEK/Silica | 25/66/9 | Invention |

The above-mentioned compositions/materials were tested in accordance to the Experimental Procedure described above, with the heating profile described in Table 1, with a single pass through the reflow machine. A "popcorning" effect was noted as a visual defect. This occurred when residual moisture, collected after conditioning, converted to steam within the part, thereby disrupting the part dimension. The samples were evaluated. A "Pass" was given to samples that did not exhibit popcorning while "Fail" was given to samples that did exhibit a popcorning effect. The results are summarized in Table 8 below:

TABLE 8

| | | | 260° C. Single pass | | | | | | | |
|---|---|---|---|---|---|---|---|---|---|---|
| | | | Dry | | | 60° C./60% RH | | | 80° C./85% RH | | |
| Ex | Component | Ratio | 1 mm | 2 mm | 3 mm | 1 mm | 2 mm | 3 mm | 1 mm | 2 mm | 3 mm |
| 17 | XH1015/PEEK/Silica | 75/15/10 | Pass | Pass | Pass | Pass | Fail | Fail | Pass | Fail | Fail |
| 18 | XH1015/PEEK/Silica | 65/15/20 | Pass | Pass | Pass | Pass | Fail | Fail | Pass | Fail | Fail |
| 19 | XH1015/PEEK/Silica | 55/15/30 | Pass | Pass | Pass | Pass | Fail | Fail | Fail | Fail | Fail |
| 20 | XH1015/PEEK/Silica | 65/5/30 | Pass | Pass | Pass | Pass | Fail | Fail | Fail | Fail | Fail |
| 21 | XH1015/PEEK/Silica | 25/66/9 | Pass | Pass | Pass | Pass | Pass | Pass | Pass | Pass | Pass |

These results show that when the parts were dry (unconditioned), not subject to the heat and moisture conditions, parts having a thickness of 1 mm, 2 mm, and 3 mm all passed. However, when the parts were exposed to conditions that included 60° C./60% RH (Relatively Humidity), the only composition that passed at 1 mm, 2 mm, and 3 mm was the compositions of Example 21. All the other compositions failed.

When the parts were exposed to conditions that included 80° C./85% RH, the only composition that passed at 1 mm, 2 mm, and 3 mm was the compositions of Example 21. All the other compositions failed Examples 22-26

260° C., 1st Pass, XH1015-PEEK, Warpage Evaluation

Of the compositions evaluated, the XH1015-PEEK sample performed best in the reflow test. The composition passed the all conditions during the reflow and displayed the greatest dimensional stability.

The P2-PEEK composition was focus for a second DoE, and Silica was added as a potential cost reduction for the blend.

The purpose of these examples, shown in Table 9, was to evaluate certain compositions in accordance to the present invention for certain performance properties, namely dimensional stability, through a warpage criteria.

TABLE 9

| Example | Composition Tested | Blend Ratio | Description/Remarks |
|---|---|---|---|
| 22 | XH1015/PEEK/Silica | 75/15/10 | Comparative |
| 23 | XH1015/PEEK/Silica | 65/15/20 | Comparative |
| 24 | XH1015/PEEK/Silica | 55/15/30 | Comparative |
| 25 | XH1015/PEEK/Silica | 65/5/30 | Comparative |
| 26 | XH1015/PEEK/Silica | 25/66/9 | Invention |

The above-mentioned compositions/materials were tested in accordance to the Experimental Procedure described above, with the heating profile described in Table 1, with a single pass through the reflow machine.

The part warpage was measured with a micrometer. An acceptable warpage measurement is defined as less than 0.3 mm increase at the apex of the part. Samples that "popcorned" in earlier examples were not measured.

Results:

TABLE 10

| | | | Dry | | | 60° C./60% RH | | | 80° C./85% RH | | |
|---|---|---|---|---|---|---|---|---|---|---|---|
| Ex | Component | Ratio | 1 mm | 2 mm | 3 mm | 1 mm | 2 mm | 3 mm | 1 mm | 2 mm | 3 mm |
| 22 | XH1015/PEEK/Silica | 75/15/10 | 0.5 | 1.0 | 0.3 | 7.0 | n/a | n/a | 6.0 | n/a | n/a |
| 23 | XH1015/PEEK/Silica | 65/15/20 | 3.5 | 2.0 | 0.3 | 5.0 | n/a | n/a | 14.0 | n/a | n/a |
| 24 | XH1015/PEEK/Silica | 55/15/30 | 2.0 | 1.0 | 0.3 | 5.0 | n/a | n/a | n/a | n/a | n/a |
| 25 | XH1015/PEEK/Silica | 65/5/30 | 1.5 | 0.5 | 0.3 | 7 | n/a | n/a | n/a | n/a | n/a |
| 26 | XH1015/PEEK/Silica | 25/66/9 | 0.3 | 0.3 | 0 | 1 | 0.5 | 0.00 | 0.5 | 0.3 | 0.5 |

The results in Table 10 show that only Example 26 passed the warpage test for this heating profile. Every other example had failing parts at every moisture conditions.

Examples 27-34

260° C., 2$^{nd}$ Pass, Popcorning Evaluation

The purpose of these examples was to evaluate certain compositions in accordance to the present invention for certain performance properties, namely dimensional stability, popcorning effect (if any). Further, compositions were subjected to a second pass/run was used to further evaluate the robustness of the composite, with a second heat-history.

Preparation Procedures

Compositions illustrating specific embodiments of the present invention were prepared in accordance to the Blend Preparation Procedure described above. Neat resins were also used. The compositions tested are summarized in Table 11.

TABLE 11

| Example | Composition Tested | Blend Ratio | Description/Remarks |
|---|---|---|---|
| 27 | XH1015 | Neat | Comparative (Neat Resin) |
| 28 | UH1006 | Neat | Comparative (Neat Resin) |
| 29 | XH1015/PEEK | 60/40 | Invention |
| 30 | XH1015/XH6050 | 50/50 | (Comparative) |
| 31 | UH1016/PEEK/Silica | 33/50/17 | (Comparative) |
| 32 | UH1016/XH1015 | 75/25 | (Comparative) |
| 33 | UH1016/XH1015/PEEK | 20/50/30 | (Comparative) |
| 34 | UH1016/XH1015/PEEK/Silica | 17/41/25/17 | (Comparative) |

Testing Procedures

The above-mentioned compositions/materials were tested in accordance to the Experimental Procedure described above, with the heating profile described in Table 1, except that the respective composition was subjected to a second pass through the reflow machine.

A "popcorning" effect was noted as a visual defect. Popcorning occurred when residual moisture, collected after conditioning, converted to steam within the part, thereby disrupting the part dimension. The samples were evaluated. A "Pass" was given to samples that did not exhibit popcorning as well as warpage while a "Fail" was given to samples that did exhibit a popcorning effect.

Results

The results obtained are summarized in Table 12 below:

TABLE 12

| | | Dry | | | 60° C./60% RH | | | 80° C./85% RH | | |
|---|---|---|---|---|---|---|---|---|---|---|
| Ex | Composition | 1 mm | 2 mm | 3 mm | 1 mm | 2 mm | 3 mm | 1 mm | 2 mm | 3 mm |
| 27 | XH1015 | Pass | Pass | Pass | Pass | Fail | Fail | Fail | Fail | Fail |
| 28 | UH1006 | Pass | Pass | Pass | Pass | Fail | Fail | Fail | Fail | Fail |
| 29 | XH1015/PEEK | Pass | Pass | Pass | Pass | Pass | Pass | Pass | Pass | Pass |
| 30 | XH1015/XH6050 | Pass | Pass | Pass | Fail | Fail | Fail | Fail | Fail | Fail |
| 31 | UH1016/PEEK/Silica | Pass | Pass | Pass | Pass | Pass | Fail | Pass | Fail | Fail |
| 32 | UH1016/XH1015 | Pass | Pass | Pass | Fail | Fail | Fail | Fail | Fail | Fail |
| 33 | UH1016/XH1015/PEEK | Pass | Pass | Pass | Pass | Fail | Fail | Fail | Fail | Fail |
| 34 | UH1016/XH1015/PEEK/Silica | Pass | Pass | Pass | Pass | Fail | Fail | Fail | Fail | Fail |

Discussion

These results show that when the parts were dry (unconditioned), not subject to the heat and moisture conditions, parts having a thickness of 1 mm, 2 mm, and 3 mm all passed. However, when the parts were exposed to conditions that included 60° C./60% RH (Relatively Humidity), the only composition that passed at 1 mm, 2 mm, and 3 mm was the compositions of Example 29. All the other materials/compositions failed.

When the parts were exposed to conditions that included 80° C./85% RH, the only composition that passed at 1 mm, 2 mm, and 3 mm was the compositions of Example 29. All the other materials/compositions failed.

Examples 35-42

260° C., 2$^{nd}$ Pass, Warpage

The purpose of these examples was to evaluate certain compositions in accordance to the present invention for certain performance properties, namely dimensional stability, through a warpage criteria.

Preparation Techniques

Compositions illustrating specific embodiments of the present invention were prepared in accordance to the Blend Preparation Procedure described above. Neat resins were also used. The compositions tested are summarized in Table 13.

TABLE 13

| Example | Composition Tested | Blend Ratio | Description/Remarks |
|---|---|---|---|
| 35 | XH1015 | Neat | Comparative (Neat Resin) |
| 36 | UH1006 | Neat | Comparative (Neat Resin) |
| 37 | XH1015/PEEK | 60/40 | Invention |
| 38 | XH1015/XH6050 | 50/50 | (Comparative) |
| 39 | UH1016/PEEK/Silica | 33/50/17 | (Comparative) |
| 40 | UH1016/XH1015 | 75/25 | (Comparative) |
| 41 | UH1016/XH1015/PEEK | 20/50/30 | (Comparative) |
| 42 | UH1016/XH1015/PEEK/Silica | 17/41/25/17 | (Comparative) |

Testing Techniques

The above-mentioned compositions/materials were tested in accordance to the Experimental Procedure described above, with the heating profile described in Table 1, except that the respective composition was subjected to a second pass through the reflow machine.

The part warpage was measured with a micrometer. An acceptable warpage measurement is defined as less than 0.3 mm increase at the apex of the part. Samples that "popcorned" in earlier examples were not measured.

Results:

TABLE 14

| | 260° C. Second Pass | | | | | | | | |
|---|---|---|---|---|---|---|---|---|---|
| | Dry | | | 60° C./60% RH | | | 80° C./85% RH | | |
| Ex. Composite | 1 mm | 2 mm | 3 mm | 1 mm | 2 mm | 3 mm | 1 mm | 2 mm | 3 mm |
| 35 XH1015 | 0.00 | 0.03 | | 0.00 | | | | | |
| 36 UH1006 | 0.00 | 0.00 | 0.01 | 0.00 | | | | | |
| 37 XH1015/PEEK | 0.00 | 0.01 | 0.01 | 0.00 | | 0.01 | 0.01 | | 0.02 |
| 38 XH1015/XH6050 | 0.01 | 0.04 | | | | | | | |
| 39 UH1016/PEEK/Silica | 0.00 | 0.00 | | 0.00 | 0.00 | | 0.00 | | |
| 40 UH1016/XH1015 | 0.00 | 0.00 | 0.00 | | | | | | |
| 41 UH1016/XH1015/PEEK | 0.01 | 0.01 | 0.02 | 0.01 | | | | | |
| 42 UH1016/XH1015/PEEK/Silica | 0.01 | 0.01 | 0.00 | 0.01 | | 0.02 | | | |

The results represented in Table 14, show that any part that did not popcorn, passed the warpage test for this heating profile. Dry (unconditioned), parts having a thickness of 1 mm, 2 mm, and 3 mm all passed. Part conditioned at 60° C./60% RH and 85° C./85% RH, which passed the popcorn criteria, also passed the warpage criteria.

Examples 43-50

270° C., 1$^{st}$ Pass, Popcorning Evaluation

The purpose of these examples was to evaluate certain compositions in accordance to the present invention for certain performance properties, namely dimensional stability, popcorning effect (if any).

Preparation Procedures

Compositions illustrating specific embodiments of the present invention were prepared in accordance to the Blend Preparation Procedure described above. Neat resins were also used.

The compositions tested are summarized in Table 15.

TABLE 15

| Example | Composition Tested | Blend Ratio | Description/Remarks |
|---|---|---|---|
| 43 | XH1015 | Neat | Comparative (Neat Resin) |
| 44 | UH1006 | Neat | Comparative (Neat Resin) |
| 45 | XH1015/PEEK | 60/40 | Invention |
| 46 | XH1015/XH6050 | 50/50 | (Comparative) |
| 47 | UH1016/PEEK/Silica | 33/50/17 | (Comparative) |
| 48 | UH1016/XH1015 | 75/25 | (Comparative) |
| 49 | UH1016/XH1015/PEEK | 20/50/30 | (Comparative) |
| 50 | UH1016/XH1015/PEEK/Silica | 17/41/25/17 | (Comparative) |

Testing Procedures

The above-mentioned compositions/materials were tested in accordance to the except that the respective composition was subjected to a single pass through the reflow machine.

A "popcorning" effect was noted as a visual defect. This occurred when residual moisture, collected after conditioning, converted to steam within the part, thereby disrupting the part dimension. The samples were evaluated. A "Pass" was given to samples that did not exhibit popcorning as well as warpage while a "Fail" was given to samples that did exhibit a popcorning and warpage effect. The results are summarized in Table 16 below:

TABLE 16

Popcorning Results for LED Composition DoE.
Peak Temp 270 C., First Pass

| | | Dry | | | 60° C./60% RH | | | 80° C./85% RH | | |
|---|---|---|---|---|---|---|---|---|---|---|
| Ex | Composition | 1 mm | 2 mm | 3 mm | 1 mm | 2 mm | 3 mm | 1 mm | 2 mm | 3 mm |
| 43 | XH1015 | Pass | Pass | Fail | Fail | Fail | Fail | Fail | Fail | Fail |
| 44 | UH1006 | Pass | Pass | Pass | Fail | Fail | Fail | Fail | Fail | Fail |
| 45 | XH1015/PEEK | Pass | Pass | Pass | Pass | Pass | Pass | Pass | Pass | Pass |
| 46 | XH1015/XH6050 | Pass | Pass | Fail | Fail | Fail | Fail | Fail | Fail | Fail |
| 47 | UH1016/PEEK/Silica | Pass | Pass | Pass | Pass | Pass | Fail | Pass | Pass | Fail |
| 48 | UH1016/XH1015 | Pass | Pass | Pass | Fail | Fail | Fail | Fail | Fail | Fail |
| 49 | UH1016/XH1015/PEEK | Pass | Pass | Pass | Fail | Fail | Fail | Fail | Fail | Fail |
| 50 | UH1016/XH1015/PEEK/Silica | Pass | Pass | Pass | Fail | Fail | Fail | Fail | Fail | Fail |

Discussion

These results show that when the parts were dry (unconditioned), not subject to the heat and moisture conditions, parts having a thickness of 1 mm, 2 mm, and 3 mm, only examples 44, 45, 47, 48, 49, and 50 passed. However, when the parts were exposed to conditions that consisted of 60° C./60% RH (Relatively Humidity), the only composition that passed at 1 mm, 2 mm, and 3 mm was the compositions of Example 45. All the other materials/compositions failed.

When the parts were exposed to conditions that included 80° C./85% RH, the only composition that passed at 1 mm, 2 mm, and 3 mm was the compositions of Example 45. All the other materials/compositions failed.

Examples 51-58

270° C., 1st Pass, Warpage Evaluation

The purpose of these examples was to evaluate certain compositions in accordance to the present invention for certain performance properties, namely dimensional stability, through a warpage criteria.

Preparation Techniques

Compositions illustrating specific embodiments of the present invention were prepared in accordance to the Blend Preparation Procedure described above. Neat resins were also used. The compositions tested are summarized in Table 17.

TABLE 17

| Example | Composition Tested | Blend Ratio | Description/Remarks |
|---|---|---|---|
| 51 | XH1015 | Neat | Comparative (Neat Resin) |
| 52 | UH1006 | Neat | Comparative (Neat Resin) |
| 53 | XH1015/PEEK | 60/40 | Invention |
| 54 | XH1015/XH6050 | 50/50 | (Comparative) |
| 55 | UH1016/PEEK/Silica | 33/50/17 | (Comparative) |
| 56 | UH1016/XH1015 | 75/25 | (Comparative) |
| 57 | UH1016/XH1015/PEEK | 20/50/30 | (Comparative) |
| 58 | UH1016/XH1015/PEEK/Silica | 17/41/25/17 | (Comparative) |

Testing Techniques

The above-mentioned compositions/materials were tested in accordance to the Experimental Procedure described above, with the heating profile described in Table 2, except that the respective composition was subjected to a single pass through the reflow machine.

The part warpage was measured with a micrometer. An acceptable warpage measurement is defined as less than 0.3 mm increase at the apex of the part. Samples that "popcorned" in earlier examples were not measured.

Results:

TABLE 18

270° C. First Pass

| | | Dry | | | 60° C./60% RH | | | 80° C./85% RH | | |
|---|---|---|---|---|---|---|---|---|---|---|
| Ex | Composite | 1 mm | 2 mm | 3 mm | 1 mm | 2 mm | 3 mm | 1 mm | 2 mm | 3 mm |
| 51 | XH1015 | 0.00 | | | | | | | | |
| 52 | UH1006 | 0.00 | 0.00 | 0.01 | | | | | | |
| 53 | XH1015/PEEK | 0.00 | 0.01 | 0.02 | 0.00 | 0.01 | 0.03 | 0.00 | 0.00 | 0.03 |
| 54 | XH1015/XH6050 | 0.03 | | | | | | | | |
| 55 | UH1016/PEEK/Silica | 0.00 | 0.01 | | 0.00 | 0.00 | | 0.01 | 0.01 | |
| 56 | UH1016/XH1015 | 0.00 | 0.00 | 0.00 | | | | | | |
| 57 | UH1016/XH1015/PEEK | 0.01 | 0.00 | 0.02 | | | | | | |
| 58 | UH1016/XH1015/PEEK/Silica | 0.00 | 0.01 | 0.01 | | | | | | |

The results represented in Table 18 show that any part that did not popcorn, passed the warpage test for this heating profile. Dry (unconditioned), parts having a thickness of 1 mm, 2 mm, and 3 mm all passed. Part conditioned at 60° C./60% RH and 85° C./85% RH, which passed the popcorn criteria, also passed the warpage criteria.

Example 59

VICTREX™ PEEK 150 was reported to have a moisture absorption of approximately 0.5 wt %, based on immersion for 24 hours according to ASTM D570.

These results show that PEEK did not metalized well and, as such, would be an unsuitable choice to make for applications that include reflector substrates.

Any element in a claim that does not explicitly state "means for" performing a specified function, or "step for" performing a specific function, is not to be interpreted as a "means" or "step" clause as specified in 35 U.S.C §112, sixth paragraph. In particular, the use of "step of" in the claims herein is not intended to invoke the provisions of 35 U.S.C §112, sixth paragraph.

What is claimed is:

1. A moisture resistant composition comprising a polymeric component consisting essentially of:
 a) 25 weight percent, based on the total weight of the composition, of a polyetherimide copolymer made from a monomer mixture comprising 3,3' bisphenol-A dianhydride (BPADA), and 4,4'-diaminodiphenyl sulfone (DDS); and
 b) 66 weight percent, based on the total weight of the composition, of polyetheretherketone (PEEK);
the moisture resistant composition further comprising
 c) 9 weight percent, based on the total weight of the composition, of a silica filler;
wherein, in conditions of dry atmosphere/260° C. and 60° C./60% relative humidity, articles having thicknesses of 2-3 mm, molded from the moisture resistant composition, each exhibit no popcorning and a warpage of less than or equal to 0.5 mm.

2. The moisture resistant composition of claim 1, wherein the monomer mixture further comprises 3-chlorophthalic anhydride.

3. The moisture resistant composition of claim 1, wherein a molded part comprising the moisture resistant composition of claim 1, and having a thickness of 3 mm does not exhibit warping in a dry atmosphere at 260° C.

4. The moisture resistant composition of claim 1, wherein a molded part comprising the moisture resistant composition of claim 1, and having a thickness of 3 mm does not exhibit warping at 60° C./60% relative humidity.

5. The moisture resistant composition of claim 1, wherein the polyetherimide copolymer of component a) is made from a monomer mixture consisting of 3,3' bisphenol-A dianhydride (BPADA), and 4,4'-diaminodiphenyl sulfone (DDS).

* * * * *